(12) United States Patent
Mineoka

(10) Patent No.: US 11,131,475 B2
(45) Date of Patent: Sep. 28, 2021

(54) OUTDOOR UNIT OF AIR-CONDITIONING APPARATUS

(71) Applicant: Mitsubishi Electric Corporation, Tokyo (JP)

(72) Inventor: Tatsuya Mineoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 10 days.

(21) Appl. No.: 16/477,225

(22) PCT Filed: Apr. 7, 2017

(86) PCT No.: PCT/JP2017/014460
§ 371 (c)(1),
(2) Date: Jul. 11, 2019

(87) PCT Pub. No.: WO2018/185923
PCT Pub. Date: Oct. 11, 2018

(65) Prior Publication Data
US 2020/0018511 A1 Jan. 16, 2020

(51) Int. Cl.
*F24F 11/64* (2018.01)
*F24F 11/65* (2018.01)
*G05D 23/30* (2006.01)
(Continued)

(52) U.S. Cl.
CPC .............. *F24F 11/67* (2018.01); *F24F 11/64* (2018.01); *F24F 11/65* (2018.01); *F24F 11/86* (2018.01);
(Continued)

(58) Field of Classification Search
CPC .......... F24F 11/67; F24F 11/65; F24F 11/871; F24F 11/64; F24F 11/86; F24F 11/56;
(Continued)

(56) References Cited

U.S. PATENT DOCUMENTS

2007/0180849 A1* 8/2007 Walker ................. F25D 11/006
62/441
2010/0011788 A1* 1/2010 Lifson ..................... F25B 49/02
62/115
(Continued)

FOREIGN PATENT DOCUMENTS

JP 2000-205636 A 7/2000
JP 2011-252641 A 12/2011

*Primary Examiner* — M. N. Von Buhr
(74) *Attorney, Agent, or Firm* — Posz Law Group, PLC

(57) ABSTRACT

An outdoor unit of an air-conditioning apparatus includes an outdoor unit main body, a compressor, an outdoor heat exchanger, an outdoor fan, an outdoor air temperature detection unit, and a control unit. The control unit stores an outdoor air temperature that is detected when the outdoor unit main body receives an operation stop signal, a temperature determination unit configured to determine whether the outdoor air temperature stored in the storage unit is less than a temperature threshold value when the outdoor unit main body receives an operation start signal, and an operation timing setting unit configured to select an operation mode of the compressor based on an outdoor air temperature detected by the outdoor air temperature detection unit after operation of the outdoor fan is resumed in a case where the temperature determination unit determines that the outdoor air temperature is less than the temperature threshold value.

7 Claims, 5 Drawing Sheets

(51) Int. Cl.
*F24F 11/67* (2018.01)
*F24F 11/871* (2018.01)
*F24F 11/86* (2018.01)
*F24F 11/56* (2018.01)
*F24F 110/12* (2018.01)

(52) U.S. Cl.
CPC ............ *F24F 11/871* (2018.01); *G05D 23/30* (2013.01); *F24F 11/56* (2018.01); *F24F 2110/12* (2018.01)

(58) Field of Classification Search
CPC .. F24F 2110/12; G05D 23/30; F25B 2600/01; F25B 49/022; F25B 2313/0294; F25B 2313/0315; F25B 13/00
See application file for complete search history.

(56) References Cited

U.S. PATENT DOCUMENTS

| | | | |
|---|---|---|---|
| 2011/0289945 A1* | 12/2011 | Choi | F25D 29/00 62/80 |
| 2012/0046797 A1* | 2/2012 | Grohman | F24F 11/30 700/296 |
| 2013/0305751 A1* | 11/2013 | Gomes | F25D 11/022 62/89 |
| 2015/0195949 A1* | 7/2015 | Liu | H05K 7/20681 62/89 |
| 2016/0091235 A1* | 3/2016 | Umehara | F24F 1/24 62/160 |
| 2020/0263916 A1* | 8/2020 | Nakajima | F25B 41/062 |

\* cited by examiner

OUTDOOR UNIT OF AIR-CONDITIONING APPARATUS

CROSS REFERENCE TO RELATED APPLICATION

This application is a U.S. national stage application of PCT/JP2017/014460 filed on Apr. 7, 2017, the contents of which are incorporated herein by reference.

TECHNICAL FIELD

The present invention relates to an outdoor unit of an air-conditioning apparatus, which is configured to control operation timings of a compressor and an outdoor fan based on an outdoor air temperature.

BACKGROUND ART

Hitherto, there has been known an outdoor unit of an air-conditioning apparatus, which is configured to select an operation mode of a compressor based on an outdoor air temperature. For example, in a cooling operation, when the outdoor air temperature is low, the air-conditioning apparatus executes a low-outdoor-air-temperature-specific operation mode suitable for a case in which the outdoor air temperature is low. In the air-conditioning apparatus, an outdoor heat exchanger serves as a condenser during the cooling operation, and the outdoor heat exchanger has a high temperature. Therefore, even after the air-conditioning apparatus stops the cooling operation and an outdoor fan is stopped, the outdoor heat exchanger has the high temperature. Therefore, when an outdoor air temperature detection unit configured to detect the outdoor air temperature is provided in the vicinity of the outdoor heat exchanger, there is a fear that the outdoor air temperature detection unit may detect a temperature that is higher than an actual outdoor air temperature as the outdoor air temperature under the effect of heat of the outdoor heat exchanger that has served as the condenser and is increased in temperature. As a result, there is a fear that, when resuming operation, the air-conditioning apparatus may operate not in the low-outdoor-air-temperature-specific operation mode but in a normal operation mode to reduce comfortability of a user.

In Patent Literature 1, there is disclosed an air-conditioning apparatus, which is configured to continuously operate an outdoor fan until a difference between an outdoor air temperature detected by an outdoor air temperature detection unit and a temperature of an outdoor heat exchanger falls below a set value after a compressor is stopped. In Patent Literature 1, when the difference between the detected outdoor air temperature and the temperature of the outdoor heat exchanger falls below the set value, the detected outdoor air temperature is set as a current outdoor air temperature. Meanwhile, in Patent Literature 2, there is disclosed an air-conditioning apparatus, which is configured to detect an outdoor air temperature at predetermined time intervals, and to always operate only an outdoor fan immediately before operation of a compressor is started. In Patent Literature 2, when a difference between an outdoor air temperature that is detected at a time when the outdoor fan is operated and an outdoor air temperature that is detected a predetermined time interval ago is larger than a predetermined value, an outdoor air temperature that is detected after the outdoor fan is operated is set as a current outdoor air temperature.

CITATION LIST

Patent Literature

Patent Literature 1: Japanese Unexamined Patent Application Publication No. 2011-252641
Patent Literature 2: Japanese Unexamined Patent Application Publication No. 2000-205636

SUMMARY OF INVENTION

Technical Problem

However, with the air-conditioning apparatus disclosed in Patent Literature 1, the outdoor fan is continuously operated until the difference between the detected outdoor air temperature and the temperature of the outdoor heat exchanger falls below the set value, and hence it is difficult to reduce standby power. Meanwhile, with the air-conditioning apparatus disclosed in Patent Literature 2, only the outdoor fan is always operated before the operation of the compressor is started, and hence there is a fear that an air-conditioning capacity per operation time may be reduced.

The present invention has been made to solve the above-mentioned problems, and therefore is to provide an outdoor unit of an air-conditioning apparatus, which is capable of reducing standby power, and increasing an air-conditioning capacity per operation time.

Solution to Problem

According to one embodiment of the present invention, there is provided an outdoor unit of an air-conditioning apparatus, the outdoor unit including: a compressor, which is configured to compress refrigerant; an outdoor heat exchanger, which is configured to exchange heat between the refrigerant and outdoor air; an outdoor fan, which is configured to send outdoor air to the outdoor heat exchanger; an outdoor air temperature detection unit, which is configured to detect a temperature of outdoor air; and a control unit, which is configured to control operation of the compressor and the outdoor fan, the control unit including: a storage unit, which is configured to store an outdoor air temperature that is detected by the outdoor air temperature detection unit at a time when operation is stopped; and an operation timing setting unit, which is configured to operate the outdoor fan and then the compressor in a case where the outdoor air temperature that is stored in the storage unit is less than a temperature threshold value when the operation is resumed, and to simultaneously operate the outdoor fan and the compressor in a case where the outdoor air temperature that is stored in the storage unit is the temperature threshold value or more when the operation is resumed.

Advantageous Effects of Invention

According to one embodiment of the present invention, in the case where the outdoor air temperature that is detected at the time when the operation is stopped is less than the temperature threshold value, the outdoor fan is operated, and then the compressor is detected. Moreover, in the case where the outdoor air temperature that is detected at the time when the operation is stopped is the temperature threshold value or more, the outdoor fan and the compressor are simultaneously operated. In this manner, when the outdoor air temperature that is detected at the time when the operation is stopped is the temperature threshold value or more, it is not required to operate only the outdoor fan, with the result that the standby power can be reduced, and the air-conditioning capacity per operation time can be increased.

DESCRIPTION OF EMBODIMENTS

Embodiment 1

Figure 1:
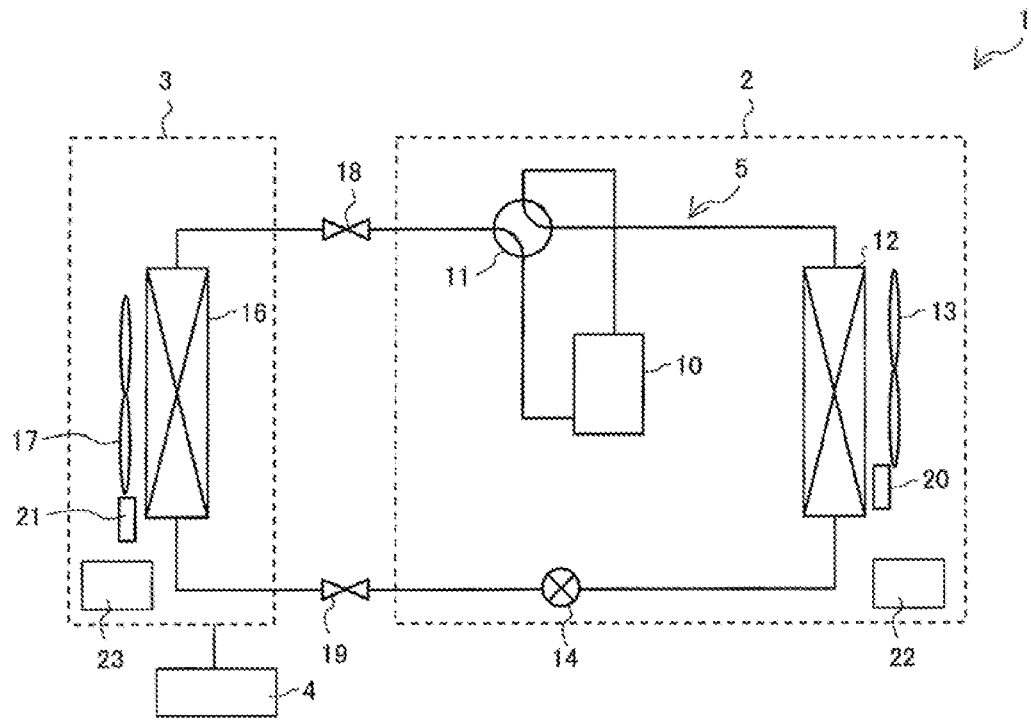
FIG. 1 is a circuit diagram for illustrating an air-conditioning apparatus 1 in Embodiment 1 of the present invention.

Now, outdoor units of an air-conditioning apparatus according to embodiments of the present invention are described with reference to the drawings. FIG. 1 is a circuit diagram for illustrating an air-conditioning apparatus 1 in Embodiment 1 of the present invention. The air-conditioning apparatus 1 is described with reference to FIG. 1. As illustrated in FIG. 1, the air-conditioning apparatus 1 includes an outdoor unit 2, an indoor unit 3, and a remote controller 4. The outdoor unit 2 and the indoor unit 3 are connected to each other via a gas-side indoor-outdoor connection valve 18 and a liquid-side indoor-outdoor connection valve 19. The gas-side indoor-outdoor connection valve 18 is a valve provided in a pipe through which gas refrigerant mainly flows, and is configured to control a flow rate of the gas refrigerant flowing through the pipe. The liquid-side indoor-outdoor connection valve 19 is a valve provided in a pipe through which liquid refrigerant mainly flows, and is configured to control a flow rate of the liquid refrigerant flowing through the pipe. The remote controller 4 is connected to the indoor unit 3 via wire or wirelessly, and is operated by a user to transmit a signal for specifying a set temperature or other setting to the indoor unit 3.

The outdoor unit 2 is a device that is installed outdoors, and includes a compressor 10, a flow switching unit 11, an outdoor heat exchanger 12, an outdoor fan 13, an expansion unit 14, an outdoor air temperature detection unit 20, and an outdoor control device 22. The indoor unit 3 is a device that is installed indoors, and includes an indoor heat exchanger 16, an indoor fan 17, a room temperature detection unit 21, and an indoor control device 23. In this case, the compressor 10, the flow switching unit 11, the outdoor heat exchanger 12, the expansion unit 14, and the indoor heat exchanger 16 are connected through the pipes to form a refrigerant circuit 5.

The compressor 10 is configured to suck refrigerant in a low-temperature and low-pressure state, compress the sucked refrigerant, and discharge the compressed refrigerant as refrigerant in a high-temperature and high-pressure state. The compressor 10 is an inverter compressor capable of controlling a capacity, for example. The flow switching unit 11 is configured to switch a direction in which the refrigerant flows in the refrigerant circuit 5, and is a four-way valve, for example. The outdoor heat exchanger 12 is a device that is configured to exchange heat between outdoor air and the refrigerant, and is a fin-and-tube heat exchanger, for example. The outdoor heat exchanger 12 serves as a condenser during a cooling operation, and as an evaporator during a heating operation. The outdoor fan 13 is a device that is provided in the vicinity of the outdoor heat exchanger 12, and that is configured to send outdoor air to the outdoor heat exchanger 12.

The expansion unit 14 is a pressure reducing valve or an expansion valve, which is configured to reduce a pressure of the refrigerant to expand the refrigerant. The expansion unit 14 is an electronic expansion valve that is adjusted in opening degree, for example.

The indoor heat exchanger 16 is a device that is configured to exchange heat between indoor air and the refrigerant, and is a fin-and-tube heat exchanger, for example. The indoor heat exchanger 16 serves as an evaporator during the cooling operation, and as a condenser during the heating operation. The indoor fan 17 is a device that is provided in the vicinity of the indoor heat exchanger 16, and that is configured to send indoor air to the indoor heat exchanger 16.

The outdoor air temperature detection unit 20 is a device that is provided in the vicinity of the outdoor heat exchanger 12, and that is configured to detect a temperature of outdoor air. The room temperature detection unit 21 is a device that is provided in the vicinity of the indoor heat exchanger 16, and that is configured to detect a temperature of indoor air.

Figure 2:
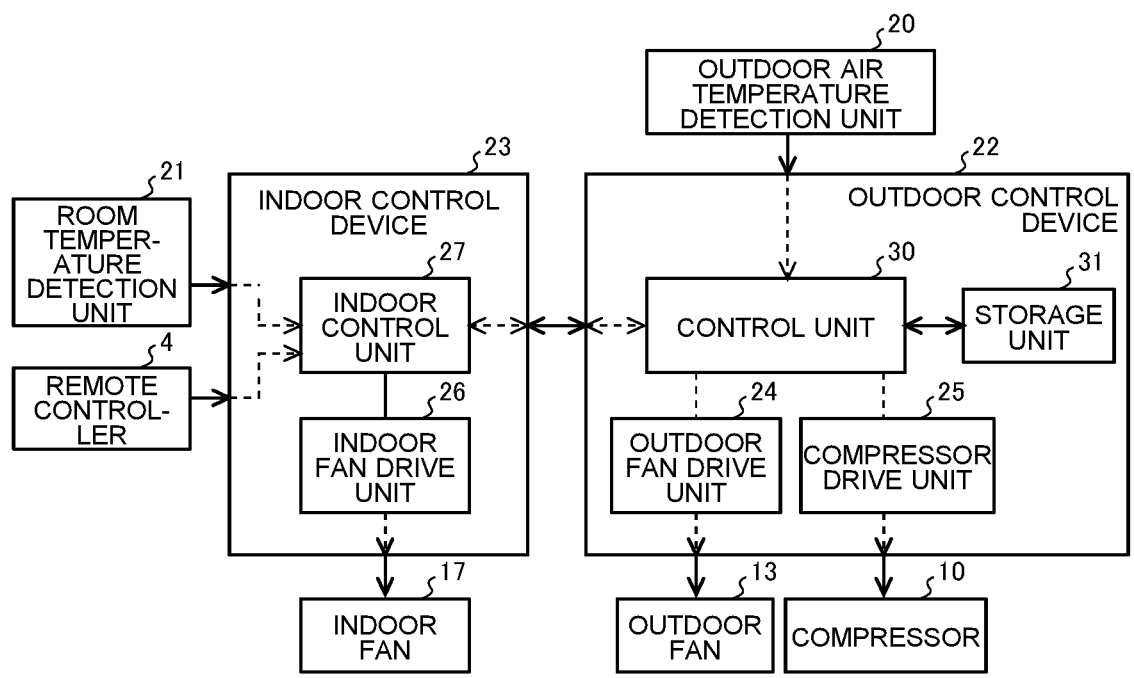
FIG. 2 is a hardware configuration diagram for illustrating the air-conditioning apparatus 1 in Embodiment 1 of the present invention.

FIG. 2 is a hardware configuration diagram for illustrating the air-conditioning apparatus 1 in Embodiment 1 of the present invention. As illustrated in FIG. 2, the outdoor control device 22 is a device that is configured to control operation of the outdoor unit 2, and includes a control unit 30, a storage unit 31, an outdoor fan drive unit 24, and a compressor drive unit 25. The control unit 30 has a function of controlling operation of the compressor 10 and the outdoor fan 13 based on a detection result obtained by the outdoor air temperature detection unit 20, and is a CPU, for example. The control unit 30 also has a function of communicating to/from the indoor control device 23 to control the operation of the compressor 10 and the outdoor fan 13 based on a signal received from the indoor control device 23. The storage unit 31 has a function of storing an outdoor air temperature that is detected by the outdoor air temperature detection unit 20, and operation time of each device, and is a memory, for example. The outdoor fan drive unit 24 has a function of driving the outdoor fan 13, and is an inverter, for example. The compressor drive unit 25 has a function of driving the compressor 10, and is an inverter, for example.

The indoor control device 23 is a device that is configured to control operation of the indoor unit 3, and includes an indoor control unit 27 and an indoor fan drive unit 26. The indoor control unit 27 has a function of controlling operation of the indoor fan 17 based on a detection result obtained by an indoor temperature detection unit and a signal received from the remote controller 4, and is a CPU, for example. The indoor control unit 27 also has a function of communicating to/from the control unit 30 of the outdoor control device 22 to control the operation of the indoor fan 17 based on a signal received from the control unit 30 of the outdoor control device 22.

In this case, when receiving an operation stop signal, the air-conditioning apparatus 1 stops the operation of the compressor 10 and the outdoor fan 13. Examples of the operation stop signal include a stop signal at a time when the user determines that air conditioning is not required and operates the remote controller 4, or a stop signal that is automatically transmitted by the air-conditioning apparatus 1 itself when a room temperature that is detected by the room temperature detection unit 21 reaches the set temperature (thermo-off). Moreover, when receiving an operation start signal, the air-conditioning apparatus 1 makes an attempt to start the operation of the compressor 10 and the outdoor fan 13. Examples of the operation start signal include a start signal at a time when the user determines that air conditioning is required and operates the remote controller 4, or a start signal that is automatically transmitted by the air-conditioning apparatus 1 itself when the room temperature that is detected by the room temperature detection unit 21 falls below the set temperature (thermo-on).

Moreover, the air-conditioning apparatus 1 has a normal mode and a low-outdoor-air-temperature-specific mode as operation modes of the compressor 10. The normal mode is an operation mode that is executed in a case where an outdoor air temperature is a mode-changing temperature threshold value or more. The low-outdoor-air-temperature-specific mode is an operation mode that is executed in a case where the outdoor air temperature is less than the mode-changing temperature threshold value, and operation suited for a low-outdoor-air-temperature environment is executed. The control unit 30 operates the compressor 10 in an operation mode that is suited for an outdoor air temperature that is detected by the outdoor air temperature detection unit 20 at a time when the compressor 10 is started. In this case, the mode-changing temperature threshold value is 0 degrees Celsius, for example.

Figure 3:
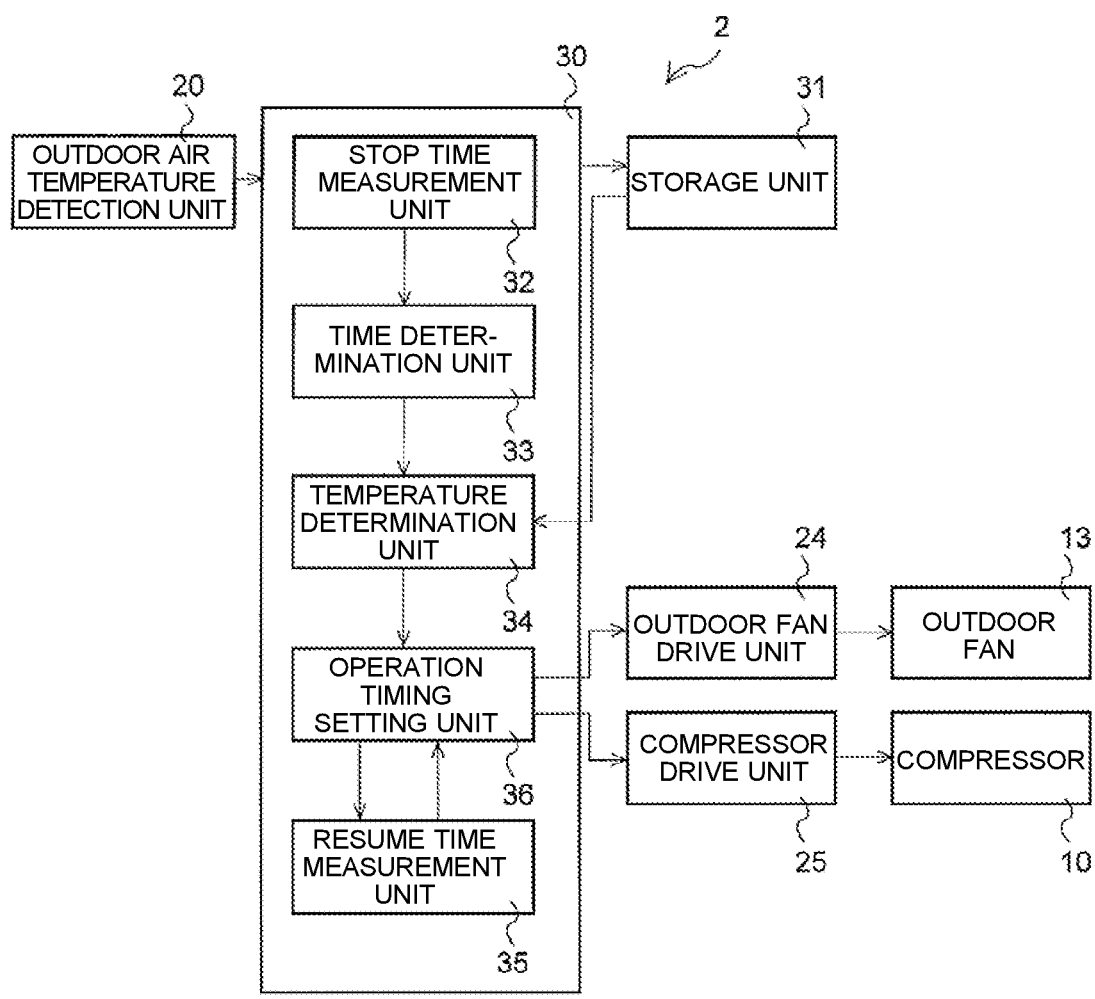
FIG. 3 is a block diagram for illustrating a control unit 30 in Embodiment 1 of the present invention.

FIG. 3 is a block diagram for illustrating the control unit 30 in Embodiment 1 of the present invention. Next, the control unit 30 is described. As illustrated in FIG. 3, the control unit 30 includes a stop time measurement unit 32, a time determination unit 33, a temperature determination unit 34, a resume time measurement unit 35, and an operation timing setting unit 36. The storage unit 31 described above may be included in the control unit 30. In this case, the storage unit 31 has a function of storing the outdoor air temperature that is detected by the outdoor air temperature detection unit 20 at a time when operation is stopped. The stop time measurement unit 32 has a function of measuring stop time from when the operation is stopped to when the operation is resumed. The time determination unit 33 has a function of determining whether the stop time that is measured by the stop time measurement unit 32 is less than a stop time threshold value.

In this case, the stop time threshold value is set as time by which the outdoor heat exchanger 12 is sufficiently cooled and there is substantially no difference between the temperature of the outdoor heat exchanger 12 and the outdoor air temperature. In the air-conditioning apparatus 1, the outdoor heat exchanger 12 serves as a condenser in the cooling operation, and hence the outdoor heat exchanger 12 has a high temperature. Therefore, even after the air-conditioning apparatus 1 stops the cooling operation and the outdoor fan 13 is stopped, the outdoor heat exchanger 12 has the high temperature. Therefore, when the outdoor air temperature detection unit 20, which is configured to detect the outdoor air temperature, is provided in the vicinity of the outdoor heat exchanger 12, there is a fear that the outdoor air temperature detection unit 20 may detect a temperature that is higher than an actual outdoor air temperature as the outdoor air temperature under the effect of heat of the outdoor heat exchanger 12 that has served as the condenser and is increased in temperature. The stop time threshold value is the time by which the difference between the temperature that is detected by the outdoor air temperature detection unit 20 and the actual outdoor air temperature is sufficiently small.

The temperature determination unit 34 has a function of determining whether the outdoor air temperature that is stored in the storage unit 31 is less than a temperature threshold value at the time when the operation is started. In this case, the temperature threshold value is 0 degrees Celsius, for example. In a case where the outdoor air temperature is higher than 0 degrees Celsius, even when there is a gap between the outdoor air temperature that is detected by the outdoor air temperature detection unit 20 and the actual outdoor air temperature, the normal mode is executed. However, in a case where the outdoor air temperature is 0 degrees Celsius or less, the low-outdoor-air-temperature-specific mode is executed. Therefore, in the case where the outdoor air temperature that is stored in the storage unit 31 is 0 degrees Celsius or less, it is required to recognize which of the low-outdoor-air-temperature-specific mode or the normal mode is to be executed by detecting a current and accurate outdoor air temperature.

The temperature determination unit 34 further has a function of determining, in a case where the time determination unit 33 determines that the time is less than the stop time threshold value, whether the outdoor air temperature that is stored in the storage unit 31 is less than the temperature threshold value. The resume time measurement unit 35 has a function of measuring, in the case where the temperature determination unit 34 determines that the outdoor air temperature is less than the temperature threshold value, resume time after the outdoor fan 13 resumes the operation.

The operation timing setting unit 36 is configured to operate the outdoor fan 13 and then the compressor 10 in the case where the temperature determination unit 34 determines that the outdoor air temperature that is stored in the storage unit 31 is less than the temperature threshold value, and to simultaneously operate the outdoor fan 13 and the compressor 10 in the case where the temperature determination unit 34 determines that the outdoor air temperature that is stored in the storage unit 31 is the temperature threshold value or more.

The operation timing setting unit 36 also has a function of simultaneously operating the outdoor fan 13 and the compressor 10 in a case where the time determination unit 33 determines that the stop time is the stop time threshold value or more. The operation timing setting unit 36 further has a function of operating the compressor 10 in a case where the resume time that is measured by the resume time measurement unit 35 is a resume time threshold value or more. In this case, the resume time threshold value is set as time by which the outdoor fan 13 is operated to send the outdoor air to the outdoor air temperature detection unit 20 and the outdoor air temperature detection unit 20 detects the accurate outdoor air temperature.

(Operation Mode of Air-Conditioning Apparatus 1, Cooling Operation)

Next, operation modes of the air-conditioning apparatus 1 are described. The cooling operation is described first. In the cooling operation, the refrigerant that is sucked by the compressor 10 is compressed by the compressor 10, and is discharged in a high-temperature and high-pressure gas state. The refrigerant in the high-temperature and high-pressure gas state that is discharged from the compressor 10 passes through the flow switching unit 11, flows into the outdoor heat exchanger 12 serving as a condenser, and exchanges heat with the outdoor air that is sent by the outdoor fan 13 in the outdoor heat exchanger 12 to be condensed and liquified. The refrigerant in the condensed liquid state flows into the expansion unit 14, and is expanded and reduced in pressure in the expansion unit 14 to become refrigerant in a low-temperature and low-pressure two-phase gas-liquid state. Then, the refrigerant in the two-phase gas-liquid state flows into the indoor heat exchanger 16 serving as an evaporator, and exchanges heat with the indoor air to be evaporated and gasified in the indoor heat exchanger 16. At this time, the indoor air is cooled, and cooling is performed in a room. The evaporated refrigerant in the low-temperature and low-pressure gas state passes through the flow switching unit 11, and is sucked by the compressor 10.

(Operation Mode, Heating Operation)

Next, the heating operation is described. In the heating operation, the refrigerant that is sucked by the compressor 10 is compressed by the compressor 10, and is discharged in a high-temperature and high-pressure gas state. The refrigerant in the high-temperature and high-pressure gas state that is discharged from the compressor 10 passes through the flow switching unit 11, flows into the indoor heat exchanger 16 serving as a condenser, and exchanges heat with the indoor air that is sent by the indoor fan 17 in the indoor heat exchanger 16 to be condensed and liquified. At this time, the indoor air is heated, and heating is performed in the room. The refrigerant in the condensed liquid state flows into the expansion unit 14, and is expanded and reduced in pressure in the expansion unit 14 to become refrigerant in a low-temperature and low-pressure two-phase gas-liquid state. Then, the refrigerant in the two-phase gas-liquid state flows into the outdoor heat exchanger 12 serving as an evaporator, and exchanges heat with the outdoor air to be evaporated and gasified in the outdoor heat exchanger 12. The evaporated refrigerant in the low-temperature and low-pressure gas state passes through the flow switching unit 11, and is sucked by the compressor 10.

Figure 4:
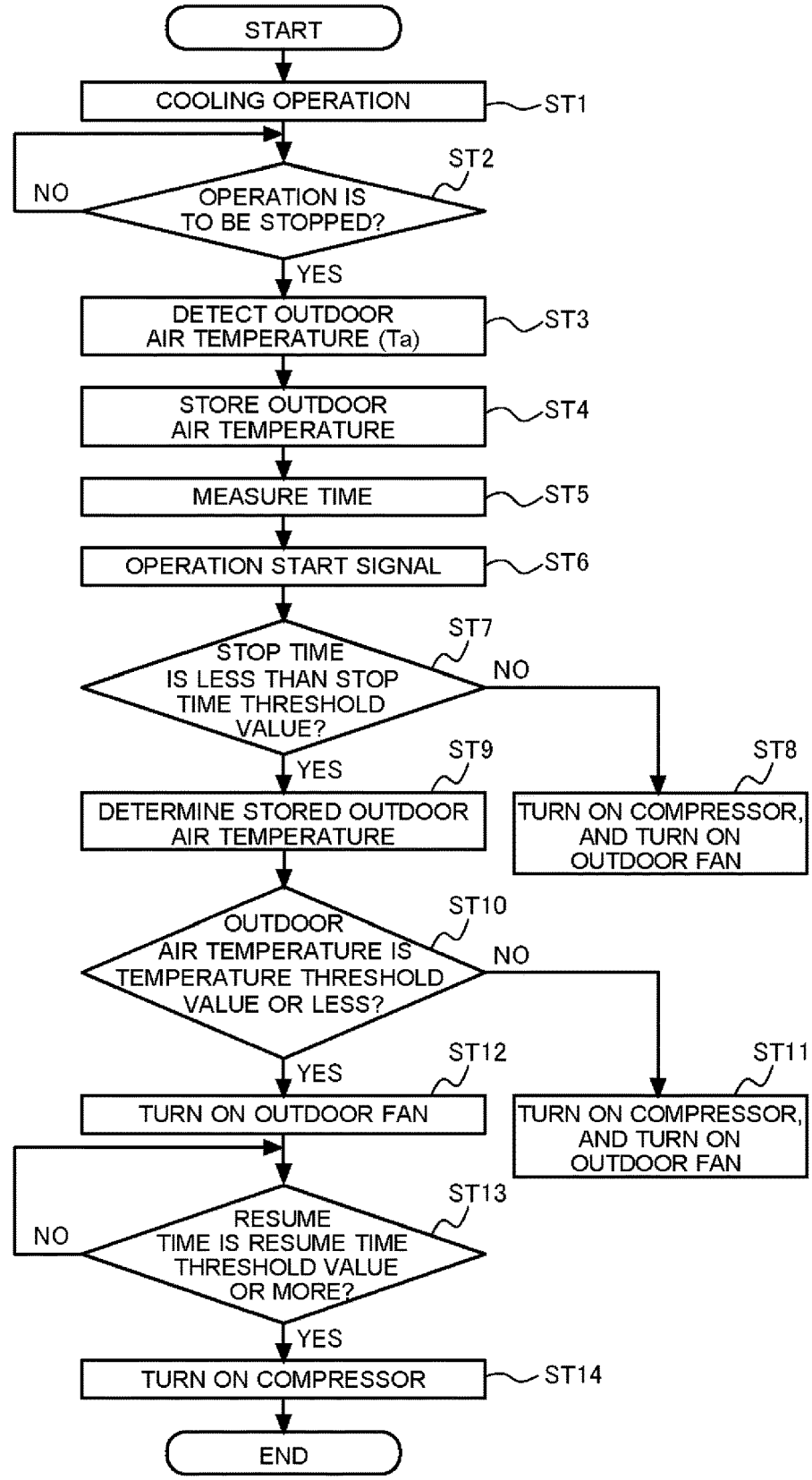
FIG. 4 is a flow chart for illustrating operation of an outdoor unit 2 according to Embodiment 1 of the present invention.

FIG. 4 is a flow chart for illustrating operation of the outdoor unit 2 according to Embodiment 1 of the present invention. Next, operation of the control unit 30 is described with the use of the flow chart. As illustrated in FIG. 4, when the air-conditioning apparatus 1 is in the cooling operation (Step ST1), it is determined whether the operation stop signal has been received (Step ST2). When no operation stop signal has been received (No in Step ST2), Step ST2 is repeated, and when the operation stop signal has been received (Yes in Step ST2), the compressor 10 and the outdoor fan 13 are stopped, and an outdoor air temperature Ta is detected by the outdoor air temperature detection unit 20 (Step ST3). The detected outdoor air temperature Ta is stored in the storage unit 31 (Step ST4).

Now, the stop time from when the operation is stopped to when the operation is resumed is measured by the stop time measurement unit 32 (Step ST5), and the measured stop time is stored in the storage unit 31. When the operation start signal is received (Step ST6), the time determination unit 33 determines whether the stop time that is measured by the stop time measurement unit 32 is less than a stop time threshold value T1 (Step ST7). In a case where the measured stop time is the stop time threshold value T1 or more (No in Step ST7), the outdoor fan 13 resumes operation, and an operation mode based on outdoor air temperature that is detected by the outdoor air temperature detection unit 20 is selected to resume the operation of the compressor 10 (Step ST8). In this manner, the operation of the outdoor fan 13 and the compressor 10 is simultaneously resumed.

Meanwhile, in a case where the measured stop time is less than the stop time threshold value T1 (Yes in Step ST7), the temperature determination unit 34 further determines whether the outdoor air temperature Ta that is stored in the storage unit 31 in Step ST4 is less than the temperature threshold value, which is 0 degrees Celsius, for example (Step ST9 and Step ST10). In a case where the stored outdoor air temperature is the temperature threshold value (0 degrees Celsius) or more (No in Step ST10), the operation of the outdoor fan 13 is resumed, and the operation mode based on an outdoor air temperature that is detected by the outdoor air temperature detection unit 20 is selected to resume the operation of the compressor 10 (Step ST11). In this manner, the operation of the outdoor fan 13 and the compressor 10 is simultaneously resumed. Meanwhile, in a case where the stored outdoor air temperature Ta is less than the temperature threshold value (0 degrees Celsius) (Yes in Step ST10), the operation of the outdoor fan 13 is resumed first (Step ST12). Then, the resume time after the operation of the outdoor fan 13 is resumed is measured by the resume time measurement unit 35, and it is determined whether the resume time after the operation is resumed is a resume time threshold value T2 or more (Step ST13). In a case where the resume time after the operation is resumed is less than the resume time threshold value T2 (No in Step ST13), Step ST13 is repeated, and in a case where the resume time after the operation is resumed is the resume time threshold value T2 or more (Yes in Step ST13), the operation mode based on the outdoor air temperature that is detected by the outdoor air temperature detection unit 20 is selected to resume the operation of the compressor 10 (Step ST14).

In Embodiment 1, the case in which the operation mode of the compressor 10 is selected based on the outdoor air temperature that is detected by the outdoor air temperature detection unit 20 at the time when the compressor 10 is started is described as an example. However, the present invention is not limited thereto, and the operation mode of the compressor 10 may be selected based on the outdoor air temperature that is stored in the storage unit 31 at the time when the operation is stopped. For example, in the case where the stop time is less than the stop time threshold value, it is predicted that the outdoor air temperature has not changed significantly, and hence the operation mode of the compressor 10 may be predicted using the outdoor air temperature that has already been stored without detecting an outdoor air temperature again. In this manner, the trouble of detecting the outdoor air temperature again can be dispensed with.

Figure 5:
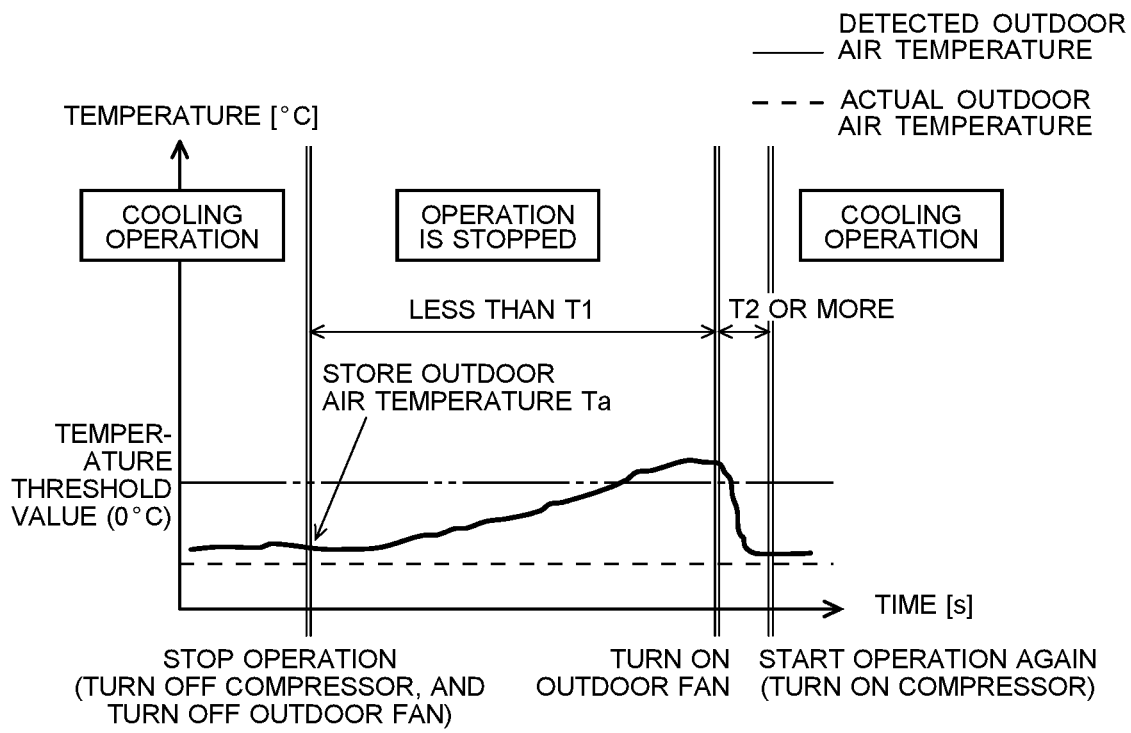
FIG. 5 is a timing chart for showing the operation of the outdoor unit 2 according to Embodiment 1 of the present invention.

FIG. 5 is a timing chart for showing the operation of the outdoor unit 2 according to Embodiment 1 of the present invention. Next, the operation of the control unit 30 is described with the use of the timing chart. In FIG. 5, the horizontal axis indicates time (s), and the vertical axis indicates a temperature (degrees Celsius). Moreover, in FIG. 5, the actual outdoor air temperature is shown by the dotted line, and the outdoor air temperature that is detected by the outdoor air temperature detection unit 20 is shown by the solid line. As shown in FIG. 5, when the detected air-conditioning apparatus 1 is in the cooling operation, the operation stop signal is received, and the compressor 10 and the outdoor fan 13 are stopped.

At this time, the outdoor air temperature Ta that is detected by the outdoor air temperature detection unit 20 is a temperature that is slightly higher than the actual outdoor air temperature because the outdoor fan 13 has been operated, and the difference therebetween is quite small. The outdoor air temperature that is detected by the outdoor air temperature detection unit 20 thereafter is gradually increased under the effect of the outdoor heat exchanger 12 that has served as a condenser and is increased in temperature because the outdoor fan 13 as well as the compressor 10 is stopped. In this manner, in the case where the stop time is less than the stop time threshold value T1, the outdoor heat exchanger 12 is not cooled, and hence the outdoor air temperature that is detected by the outdoor air temperature detection unit 20 is higher than the actual outdoor air temperature. Then, when the operation start signal is received, and when the outdoor air temperature that is detected by the outdoor air temperature detection unit 20 exceeds the temperature threshold value, which is 0 degrees Celsius, the operation of the outdoor fan 13 is resumed.

As a result, the outdoor air is sent to the outdoor heat exchanger 12, and hence the outdoor air temperature that is detected by the outdoor air temperature detection unit 20 is reduced to approach the actual outdoor air temperature. Then, in a case where the resume time is the resume time threshold value T2, which is set as the time by which the outdoor air temperature detection unit 20 detects the accurate outdoor air temperature, or more, the outdoor air temperature that is detected by the outdoor air temperature detection unit 20 is extremely close to the actual outdoor air temperature. Therefore, an appropriate operation mode of the compressor 10 can be selected reliably based on the outdoor air temperature that is detected by the outdoor air temperature detection unit 20.

Figure 6:
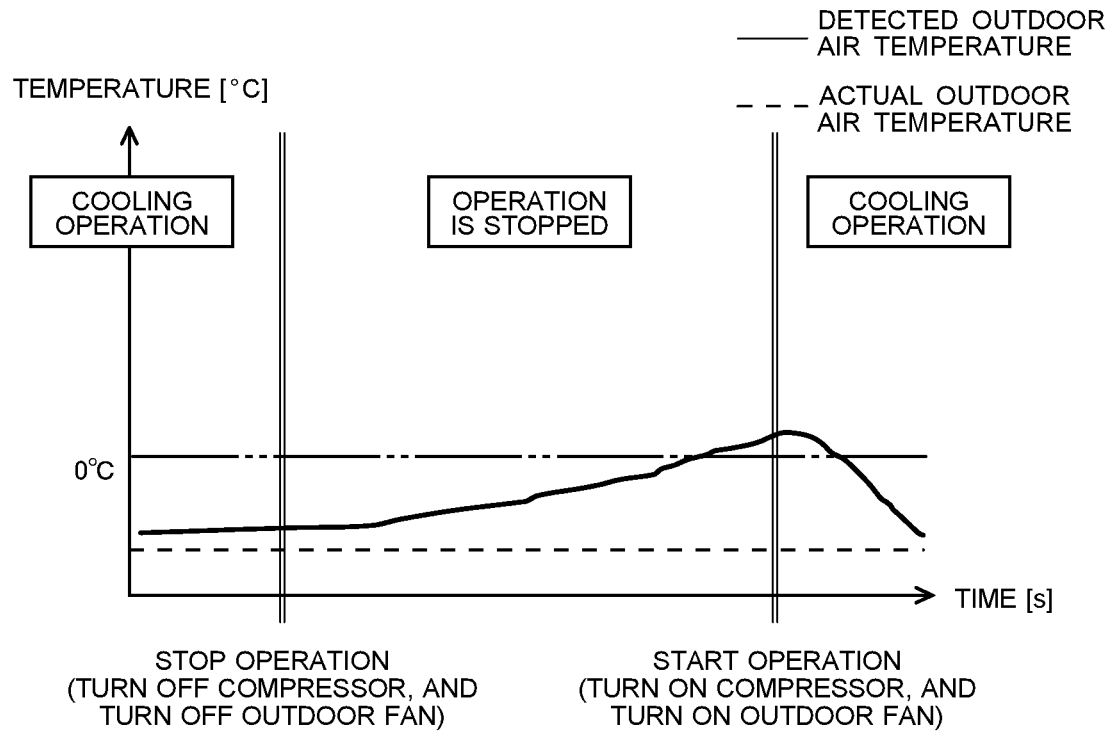
FIG. 6 is a timing chart for showing operation of the outdoor unit 2 in a comparative example.

FIG. 6 is a timing chart for showing operation of an outdoor unit in a comparative example. Next, for comparison to the operation of the outdoor unit 2 according to Embodiment 1, the operation of the outdoor unit 2 in the comparative example is described with the use of the timing chart. In FIG. 6, the horizontal axis indicates time (s), and the vertical axis indicates a temperature (degrees Celsius). Moreover, in FIG. 6, the actual outdoor air temperature is shown by the dotted line, and the outdoor air temperature that is detected by the outdoor air temperature detection unit is shown by the solid line. As shown in FIG. 6, when the detected air-conditioning apparatus 1 is in the cooling operation, the operation stop signal is received, and the compressor and the outdoor fan are stopped.

At this time, the outdoor air temperature that is detected by the outdoor air temperature detection unit is a temperature that is slightly higher than the actual outdoor air temperature because the outdoor fan has been operated, and the difference therebetween is quite small. The outdoor air temperature that is detected by the outdoor air temperature detection unit thereafter is gradually increased under the effect of the outdoor heat exchanger that has served as a condenser and is increased in temperature because the outdoor fan as well as the compressor is stopped. In this manner, in the case where the stop time is less than the stop time threshold value, the outdoor heat exchanger is not cooled, and hence the outdoor air temperature that is detected by the outdoor air temperature detection unit is higher than the actual outdoor air temperature.

Then, when the operation start signal is received, the operation of the compressor and the outdoor fan is resumed. At this time, the compressor is operated in the operation mode suitable for the outdoor air temperature at startup. Therefore, even with an outdoor air temperature at which the compressor is to be operated in the low-outdoor-air-temperature-specific mode otherwise, when the outdoor air temperature that is detected by the outdoor air temperature detection unit exceeds the temperature threshold value, which is 0 degrees Celsius, the compressor is operated in the normal mode disadvantageously.

In contrast, according to Embodiment 1, in the case where the outdoor air temperature that is detected at the time when the operation is stopped is less than the temperature threshold value, the outdoor fan 13 is operated, and then the compressor 10 is operated. Moreover, in the case where the outdoor air temperature that is detected at the time when the operation is stopped is the temperature threshold value or more, the outdoor fan 13 and the compressor 10 are simultaneously operated. In this manner, when the outdoor air temperature that is detected at the time when the operation is stopped is the temperature threshold value or more, it is not required to operate only the outdoor fan 13, and hence standby power is reduced to contribute to energy saving. Moreover, when the outdoor air temperature that is detected at the time when the operation is stopped is the temperature threshold value or more, it is not required to operate only the outdoor fan 13, and hence an air-conditioning capacity per operation time can be increased.

Moreover, the operation timing setting unit 36 is configured to operate the outdoor fan 13, and then operate the compressor 10 based on the outdoor air temperature that is detected by the outdoor air temperature detection unit 20 in the case where the outdoor air temperature that is stored in the storage unit 31 is less than the temperature threshold value. The outdoor fan 13 is operated to send the outdoor air to the outdoor air temperature detection unit 20, and hence the outdoor air temperature detection unit 20 can detect an accurate outdoor air temperature without erroneously detecting a high outdoor air temperature. Therefore, the operation mode of the compressor 10 can be executed reliably based on the accurate outdoor air temperature.

Moreover, the operation timing setting unit 36 operates the outdoor fan 13, and simultaneously operate the compressor 10 based on the outdoor air temperature that is detected by the outdoor air temperature detection unit 20 in the case where the outdoor air temperature that is stored in the storage unit 31 is the temperature threshold value or more. In the case where the outdoor air temperature is the temperature threshold value or more, it is not required to execute the low-outdoor-air-temperature-specific mode, and hence even when there is a gap between the outdoor air temperature that is detected by the outdoor air temperature detection unit 20 and the actual outdoor air temperature, thresholding of the outdoor air temperature is not performed. As a result, a processing load of the control unit 30 can be reduced.

Further, the control unit 30 further includes the temperature determination unit 34, which is configured to determine whether the outdoor air temperature that is stored in the storage unit 31 is less than the temperature threshold value. Moreover, the control unit 30 further includes the stop time measurement unit 32, which is configured to measure the stop time from when the operation is stopped to when the operation is resumed, and the time determination unit 33, which is configured to determine whether the stop time that is measured by the stop time measurement unit 32 is less than the stop time threshold value, and the temperature determination unit 34 is configured to determine, in the case where the time determination unit 33 determines that the stop time is less than the stop time threshold value, whether the outdoor air temperature that is stored in the storage unit 31 is less than the temperature threshold value. Then, the operation timing setting unit 36 is configured to simultaneously operate the outdoor fan 13 and the compressor 10 in the case where the time determination unit 33 determines that the stop time is the stop time threshold value or more. When the stop time is the stop time threshold value or more, the outdoor heat exchanger 12 is sufficiently cooled, and the difference between the outdoor air temperature that is detected by the outdoor air temperature detection unit 20 and the actual outdoor air temperature is small. Therefore, in the case where the stop time is the stop time threshold value or more, the processing load of the control unit 30 can be reduced.

Further, the control unit 30 further includes the resume time measurement unit 35, which is configured to measure the resume time after the outdoor fan 13 resumes the operation in the case where the outdoor air temperature that is stored in the storage unit 31 is less than the temperature threshold value, and the operation timing setting unit 36 is configured to operate the compressor 10 based on the outdoor air temperature that is detected by the outdoor air temperature detection unit 20 in the case where the resume time that is measured by the resume time measurement unit 35 is the resume time threshold value or more. In the case where the measured time is less than the resume time threshold value, an amount of outdoor air sent by the outdoor fan 13 is insufficient, and the difference between the outdoor air temperature that is detected by the outdoor air temperature detection unit 20 and the actual outdoor air temperature is still large. When it is determined that the measured time is the resume time threshold value or more, it can be determined that the outdoor air temperature that is detected by the outdoor air temperature detection unit 20 is approaching the actual outdoor air temperature. As a result, the operation mode of the compressor 10 based on the outdoor air temperature can be executed reliably in the low-outdoor-air-temperature environment.

Moreover, the control unit 30 is configured to operate the compressor 10 in the low-outdoor-air-temperature-specific mode suitable for the low outdoor air temperature in the case where the outdoor air temperature that is detected by the outdoor air temperature detection unit 20 is less than the mode-changing temperature threshold value, and operates the compressor 10 in the normal mode in the case where the outdoor air temperature that is detected by the outdoor air temperature detection unit 20 is the mode-changing temperature threshold value or more. In Embodiment 1, in the case where the stored outdoor air temperature is less than the temperature threshold value, the outdoor fan 13 is operated to send the outdoor air to the outdoor air temperature detection unit 20, and hence the outdoor air temperature detection unit 20 can detect an accurate outdoor air temperature without erroneously detecting a high outdoor air temperature. Therefore, the operation mode of the compressor 10 can be executed reliably based on the accurate outdoor air temperature.

Embodiment 2

Figure 7:
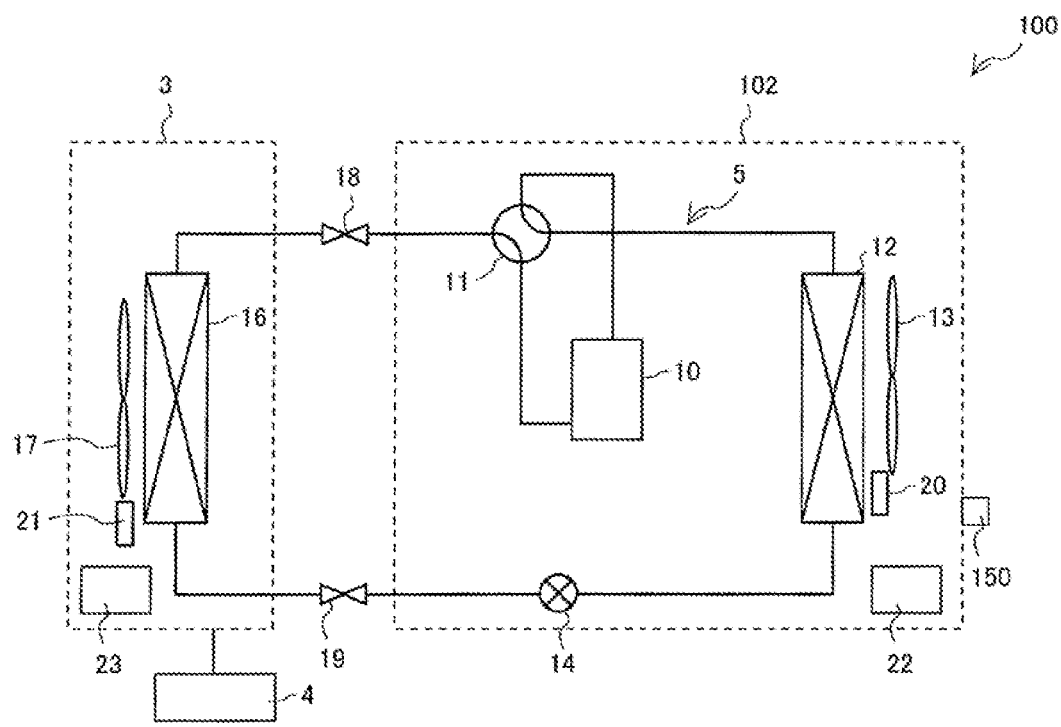
FIG. 7 is a circuit diagram for illustrating an air-conditioning apparatus 100 in Embodiment 2 of the present invention.

FIG. 7 is a circuit diagram for illustrating an air-conditioning apparatus 100 in Embodiment 2 of the present invention. Embodiment 2 is different from Embodiment 1 in including a switch 150, which is used to select whether to enable or disable control by the control unit 30. In Embodiment 2, parts that are the same as those in Embodiment 1 are denoted by the same reference symbols to omit a description thereof, and the difference from Embodiment 1 is mainly described.

As illustrated in FIG. 7, the air-conditioning apparatus 100 includes the switch 150, and the switch 150 is used to select whether to enable or disable the control by the control unit 30. In a geographic area in which it is not required to execute the cooling operation under a low outdoor air temperature, it is not required to execute the low-outdoor-air-temperature-specific mode. Therefore, the switch 150 is operated to disable the control by the control unit 30, and hence a transition to the low-outdoor-air-temperature-specific mode is not made. In this manner, an outdoor unit 102 of the air-conditioning apparatus 100 can be installed not only in a geographic area in which it is required to execute the cooling operation under a low outdoor air temperature, but also in the geographic area in which it is not required to execute the cooling operation under the low outdoor air temperature. Therefore, the outdoor unit 102 of the air-conditioning apparatus 100 has high versatility.

REFERENCE SIGNS LIST 1 air-conditioning apparatus 2 outdoor unit 3 indoor unit 4 remote controller 5 refrigerant circuit 10 compressor 11 flow switching unit 12 outdoor heat exchanger 13 outdoor fan 14 expansion unit 16 indoor heat exchanger 17 indoor fan 18 gas-side indoor-outdoor connection valve 19 liquid-side indoor-outdoor connection valve 20 outdoor air temperature detection unit 21 room temperature detection unit 22 outdoor control device 23 indoor control device 24 outdoor fan drive unit 25 compressor drive unit 26 indoor fan drive unit 27 indoor control unit 30 control unit 31 storage unit 32 stop time measurement unit 33 time determination unit 34 temperature determination unit 35 resume time measurement unit 36 operation timing setting unit 100 air-conditioning apparatus 102 outdoor unit 150 switch

The invention claimed is:

1. An outdoor unit of an air-conditioning apparatus, the outdoor unit comprising:
a compressor, which is configured to compress refrigerant;
an outdoor heat exchanger, which is configured to exchange heat between the refrigerant and outdoor air;
an outdoor fan, which is configured to send outdoor air to the outdoor heat exchanger;
an outdoor air temperature detection unit, which is configured to detect a temperature of outdoor air; and
a control unit, which is configured to control operation of the compressor and the outdoor fan to perform an operation mode of the air-conditioning apparatus,
the control unit including:
a storage unit, which is configured to store an outdoor air temperature that is detected by the outdoor air temperature detection unit at a time when the operation mode is stopped, responsive to the control unit generating an operation stop signal; and
an operation timing setting unit, which is configured to operate the outdoor fan and then the compressor in a case where the outdoor air temperature that is stored in the storage unit is less than a temperature threshold value when the operation mode is resumed, responsive to the control unit generating an operation start signal, and to simultaneously operate the outdoor fan and the compressor in a case where the outdoor air temperature that is stored in the storage unit is the temperature threshold value or more when the operation mode is resumed, responsive to the control unit generating the operation start signal.

2. The outdoor unit of an air-conditioning apparatus of claim 1, wherein the control unit further includes a temperature determination unit, which is configured to determine whether the outdoor air temperature that is stored in the storage unit is less than the temperature threshold value.

3. The outdoor unit of an air-conditioning apparatus of claim 2,
wherein the control unit further includes:
a stop time measurement unit, which is configured to measure stop time from when the operation mode is stopped to when the operation mode is resumed; and
a time determination unit, which is configured to determine whether the stop time that is measured by the stop time measurement unit is less than a stop time threshold value, and
wherein the temperature determination unit is configured to determine, in a case where the time determination unit determines that the stop time is less than the stop time threshold value, whether the outdoor air temperature that is stored in the storage unit is less than the temperature threshold value.

4. The outdoor unit of an air-conditioning apparatus of claim 3, wherein the operation timing setting unit is configured to simultaneously operate the outdoor fan and the compressor in a case where the time determination unit determines that the stop time is the stop time threshold value or more.

5. The outdoor unit of an air-conditioning apparatus of claim 1,
wherein the control unit further includes a resume time measurement unit, which is configured to measure resume time after the outdoor fan resumes operation in the case where the outdoor air temperature that is stored in the storage unit is less than the temperature threshold value, and
wherein the operation timing setting unit is configured to operate the compressor in a case where the resume time that is measured by the resume time measurement unit is a resume time threshold value or more.

6. The outdoor unit of an air-conditioning apparatus of claim 1, wherein the control unit is configured to operate the compressor in a low-outdoor-air-temperature-specific mode suited for a low outdoor air temperature in a case where the outdoor air temperature that is detected by the outdoor air temperature detection unit is less than a mode-changing temperature threshold value, and to operate the compressor in a normal mode in a case where the outdoor air temperature that is detected by the outdoor air temperature detection unit is the mode-changing temperature threshold value or more.

7. The outdoor unit of an air-conditioning apparatus of claim 1, further comprising a switch, which is used to select whether to enable or disable control by the control unit.

* * * * *